(12) United States Patent
Yoshida et al.

(10) Patent No.: US 7,839,128 B2
(45) Date of Patent: Nov. 23, 2010

(54) BIDIRECTIONAL POWER SUPPLY DEVICE

(75) Inventors: Koji Yoshida, Nara (JP); Hiroyuki Handa, Osaka (JP); Mitsuhiro Matsuo, Osaka (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/279,220

(22) PCT Filed: Apr. 27, 2007

(86) PCT No.: PCT/JP2007/059148
§ 371 (c)(1),
(2), (4) Date: Aug. 13, 2008

(87) PCT Pub. No.: WO2007/132667
PCT Pub. Date: Nov. 22, 2007

(65) Prior Publication Data
US 2009/0051337 A1    Feb. 26, 2009

(30) Foreign Application Priority Data
May 15, 2006  (JP) ............................. 2006-134888

(51) Int. Cl.
*G05F 1/613* (2006.01)
(52) U.S. Cl. ........................ 323/266; 323/283
(58) Field of Classification Search ................ 323/266, 323/268, 271, 282, 283, 351
See application file for complete search history.

(56) References Cited

U.S. PATENT DOCUMENTS

| 7,382,113 B2 * | 6/2008 | Wai et al. ..................... 323/222 |
| 7,557,546 B2 * | 7/2009 | Uruno et al. ................. 323/259 |
| 7,692,935 B2 * | 4/2010 | Yamauchi et al. ............. 363/16 |

FOREIGN PATENT DOCUMENTS

| JP | 09-233710 A | 9/1997 |
| JP | 2000-050402 A | 2/2000 |
| JP | 2003-070238 A | 3/2003 |
| JP | 3501226 | 12/2003 |

OTHER PUBLICATIONS

International Search Report for International Application No. PCT/JP2007/059148 dated Jun. 19, 2007.

* cited by examiner

*Primary Examiner*—Adolf Berhane
(74) *Attorney, Agent, or Firm*—RatnerPrestia

(57) ABSTRACT

In a bidirectional power supply device, a DC-DC converter is connected such that the longer an ON time of the first switch becomes, the higher a voltage of a second positive terminal and a second negative terminal becomes. When stopping the supply of power from a first positive terminal and a first negative terminal to a second positive terminal and a second negative terminal, a control circuit turns OFF a third switch, and then operates a switching signal generation circuit so that the ON time of the first switch becomes a maximum. The switching signal generation circuit is operated so that the ON time of the first switch becomes a maximum with the third switch turned OFF in start-up when supplying power from the second positive terminal and the second negative terminal to the first positive terminal and the first negative terminal.

4 Claims, 16 Drawing Sheets

BIDIRECTIONAL POWER SUPPLY DEVICE

This Application is a U.S. National Phase Application of PCT International Application PCT/JP2007/059148.

TECHNICAL FIELD

The present invention relates to a bidirectional power supply device capable of supplying and receiving power bidirectionally.

BACKGROUND ART

A device disclosed in patent document 1 and the like is known as a bidirectional power supply device for supplying and receiving power bidirectionally between two DC (Direct Current) power supplies. FIG. 13 is a block circuit diagram of a conventional bidirectional power supply device. Bidirectional DC-DC converter 101 is connected between battery 102a of power supply 102 and capacitor 103a of power supply 103. FIG. 13 shows an example of an automobile power supply, where capacitor 103a is connected to power generator 104 coupled to an engine (not shown). The braking energy of the automobile is first stored in capacitor 103a that can be rapidly charged/discharged, and then charged in battery 102a through DC-DC converter 101. Thus, the braking energy of the automobile is regenerated as power.

Capacitor 103a is connected to first MOS transistor 111, and second MOS transistor 112 is connected in series with MOS transistor 111. MOS transistors 111 and 112 respectively have body diodes 113 and 114 in parallel.

One end of coil 115, which is an inductance element, is connected to a node of MOS transistor 111 and MOS transistor 112, and the other end of coil 115 is connected to battery 102a by way of current sensor 116. Control circuit 117 controls ON/OFF of MOS transistors 111 and 112 in response to the output of current sensor 116.

The voltage of capacitor 103a storing the braking energy of the automobile as power is higher than the voltage of battery 102a at first. Therefore, DC-DC converter 101 performs the step-down operation. The step-down operation normally starts in a soft start.

FIG. 14A to FIG. 14C describe the step-down operation of DC-DC converter 101. FIG. 14A shows ON/OFF operation of first MOS transistor 111, FIG. 14B shows ON/OFF operation of second MOS transistor 112, and FIG. 14C shows change over time of current Iout to battery 102a. DC-DC converter 101 starts the operation at time t0. As shown in FIG. 14A, control circuit 117 gradually increases the ON time of MOS transistor 111 from near zero for the soft start. If MOS transistor 111 and MOS transistor 112 are alternately turned ON/OFF during the soft start, the on-duty of MOS transistor 112 becomes too long, so that the overcurrent may flow from battery 102a to MOS transistor 112. In order to avoid this, MOS transistor 112 is remained turned OFF during the soft start, as shown in FIG. 14B.

Current Iout to battery 102a gradually increases as shown in FIG. 14C, and reaches threshold value Th1 at time t1. Thereafter, MOS transistor 111 and MOS transistor 112 are alternately turned ON/OFF in a steady-state operation. The power of capacitor 103a is thereby charged in battery 102a, and the braking energy is effectively regenerated.

The step-down operation from capacitor 103a to battery 102a has been described in the above description, but a step-up operation is necessary if the voltage of capacitor 103a is lower than the voltage of battery 102a. In the case of the step-up operation, a circuit configuration in which coil 115 is connected to capacitor 103a side is adopted. The step-up operation is realized with a control similar to the step-down operation other than that the timing charts of MOS transistor 111 and MOS transistor 112 are interchanged. A bidirectional power supply device capable of performing the step-down operation and the step-up operation is thus provided.

The overcurrent of MOS transistor 112 is prevented in the above manner. However, since MOS transistor 112 remains turned OFF, current flowing through body diode 114 in forward direction generates every time MOS transistor 111 turns OFF the current flowing to battery 102a through coil 115 during the soft start. Body diode 114 may be overheated by the generated forward current. The present invention provides a bidirectional power supply device in which the body diode does not generate heat.

[Patent document 1] Japanese Patent No. 3,501,226

DISCLOSURE OF THE INVENTION

A bidirectional power supply device of the present invention includes a bidirectional DC-DC converter. The bidirectional DC-DC converter includes a first positive terminal, a first negative terminal, a second positive terminal, and a second negative terminal for supplying and receiving power, a capacitor connected in parallel between the first positive terminal and the first negative terminal, and a first switch and a switch connected in series and alternately and repeatedly turned ON/OFF. An inductance element having one end connected to a node of the first switch and the second switch, a switching signal generation circuit for generating an ON/OFF signal of the first switch and the second switch, and a control circuit for controlling the switching signal generation circuit are also arranged. The bidirectional DC-DC converter is connected such that the longer an ON time of the first switch becomes, the higher a voltage of the second positive terminal and the second negative terminal becomes.

The bidirectional power supply device of the present invention also includes a third switch having one end connected to the first positive terminal or the first negative terminal, and being ON/OFF controlled by the control circuit; a first power supply connected in series to the third switch, the series circuit being connected between the first positive terminal and the first negative terminal; and a second power supply connected between the second positive terminal and the second negative terminal.

The control circuit turns OFF the third switch and operates the switching signal generation circuit so that the ON time of the first switch becomes a maximum when stopping supply of power from the first positive terminal and the first negative terminal to the second positive terminal and the second negative terminal. The control circuit makes the switching signal generation circuit started so that the ON time of the first switch becomes a maximum with the third switch turned OFF when supplying power from the second positive terminal and the second negative terminal to the first positive terminal and the first negative terminal.

According to such configuration, overcurrent can be prevented since start-up is executed from the same state as when stopped. Furthermore, current does not flow to the body diode since the second switch is always turned ON while the first switch is turned OFF.

DESCRIPTION OF REFERENCE MARKS

Figure 1:
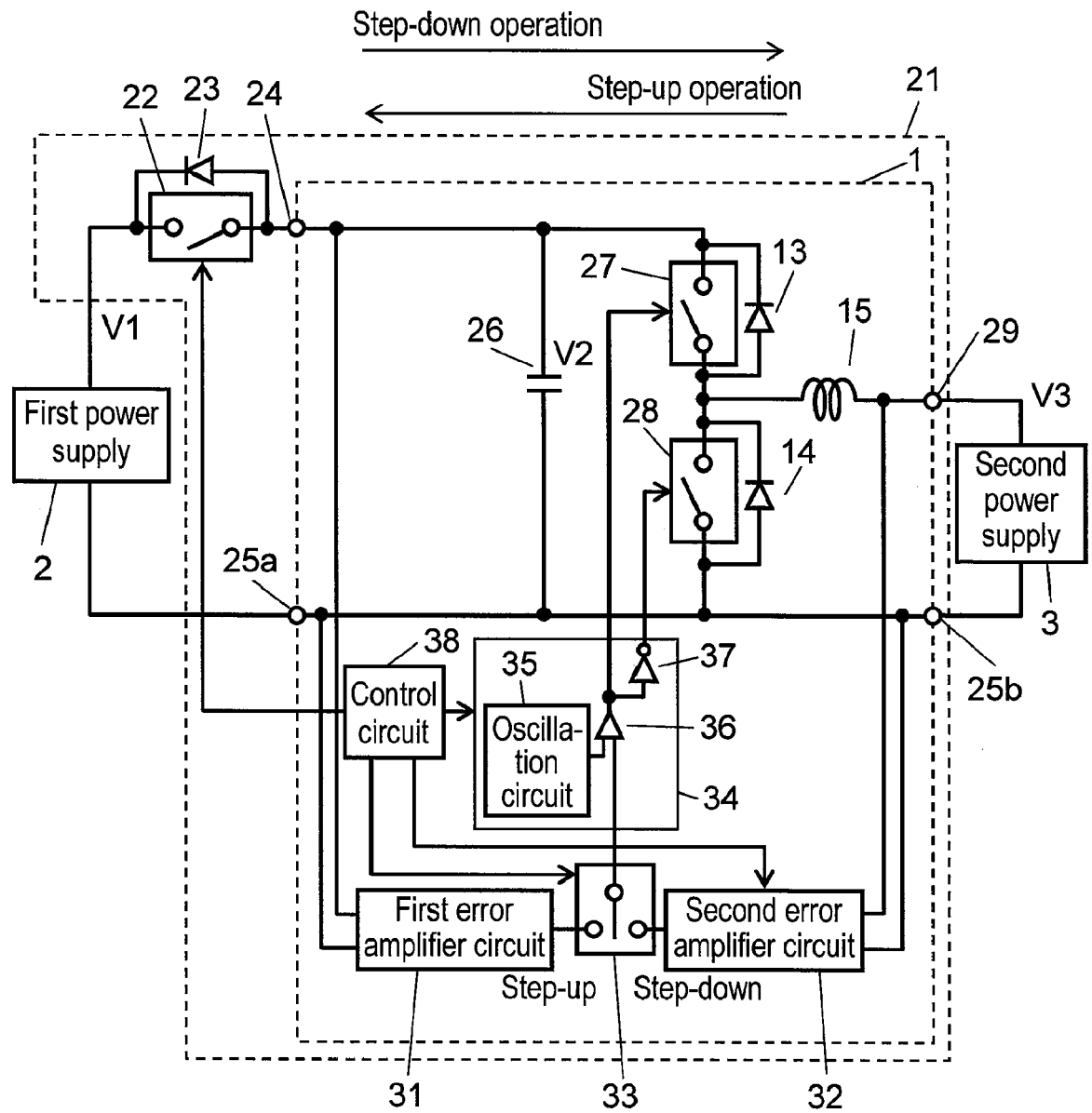
FIG. 1 is a block circuit diagram of a bidirectional power supply device according to a first embodiment of the present invention.

1 DC-DC converter
2 first power supply
3 second power supply
15 coil (inductance element)
21 bidirectional power supply device
22 third switch
24 first positive terminal
25a first negative terminal
25b second negative terminal
26 capacitor
27 first switch
28 second switch
29 second positive terminal
34 switching signal generation circuit
38 control circuit
39 auxiliary power supply

PREFERRED EMBODIMENTS FOR CARRYING OUT THE INVENTION

Preferred embodiments for carrying out the present invention will be described with reference to the drawings.

First Embodiment

Figure 2:
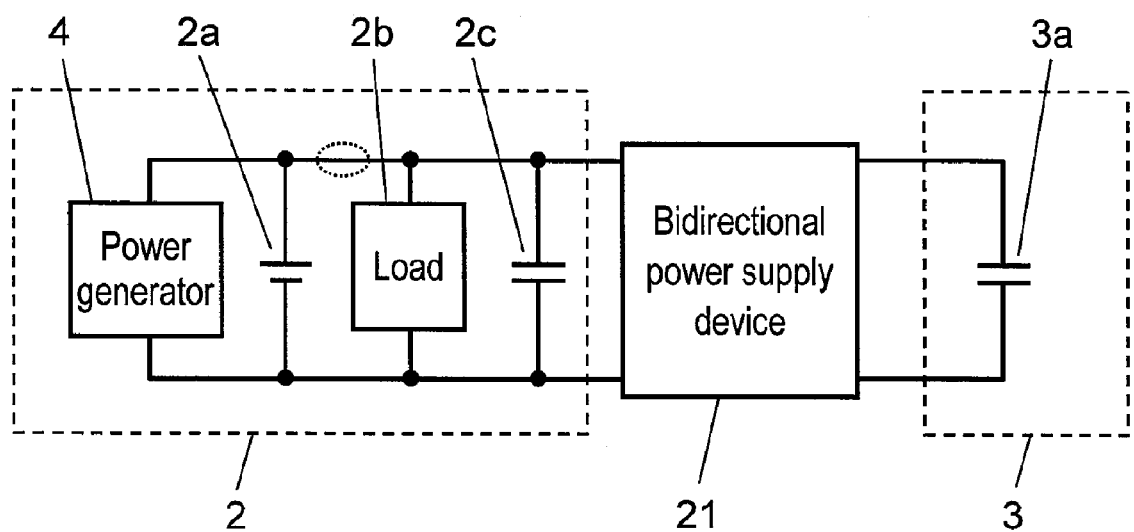
FIG. 2 is a block circuit diagram of the bidirectional power supply device and peripheral circuits of the first embodiment of the present invention.
Figure 3A:
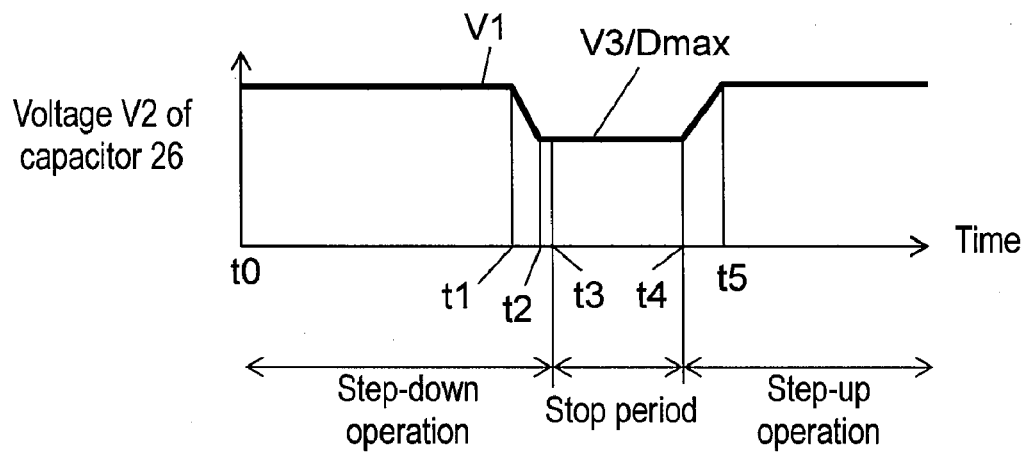
FIG. 3A is a timing chart showing change over time of voltage V2 of capacitor 26 of the first embodiment.
Figure 3B:
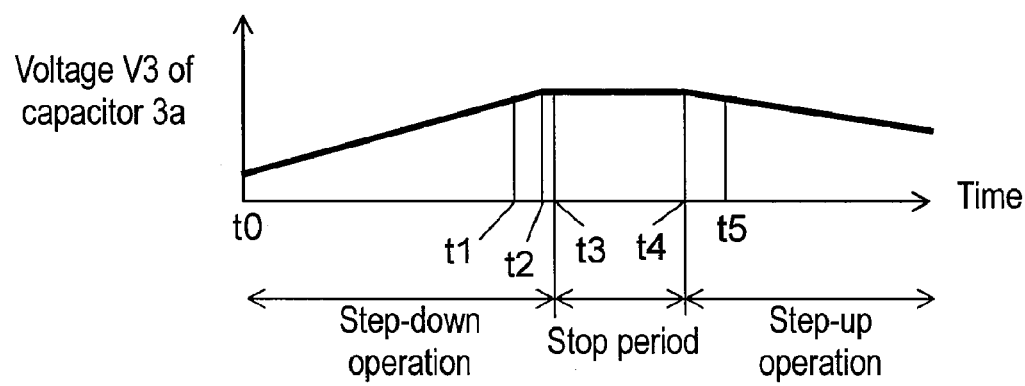
FIG. 3B is a timing chart showing change over time of voltage V3 of capacitor 3a of the first embodiment of the present invention.
Figure 3C:
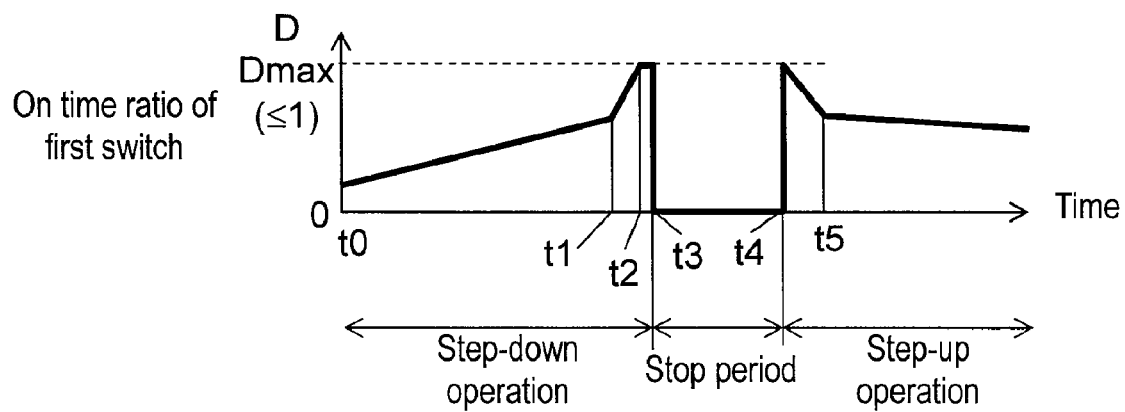
FIG. 3C is a timing chart showing change over time of ON time ratio of a first switch of the first embodiment of the present invention.
Figure 3D:
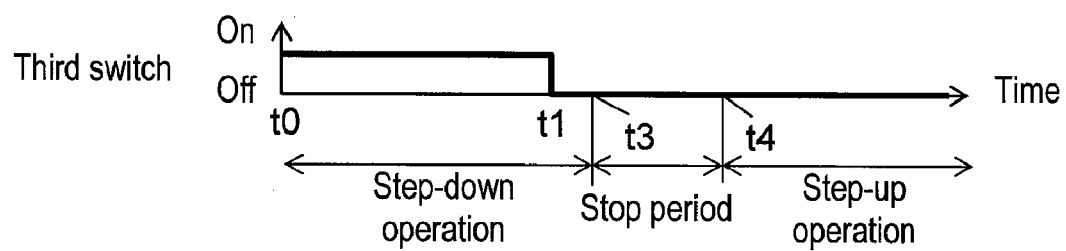
FIG. 3D is a timing chart showing an ON/OFF timing of a third switch of the first embodiment of the present invention.
Figure 3E:
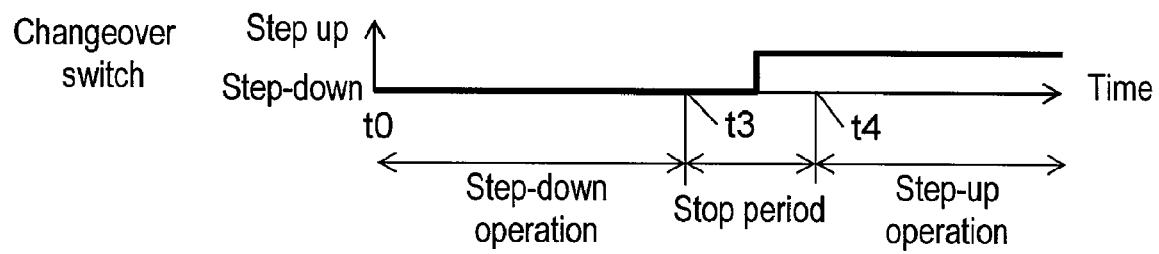
FIG. 3E is a timing chart showing a switching timing of a changeover switch of the first embodiment of the present invention.
Figure 4:
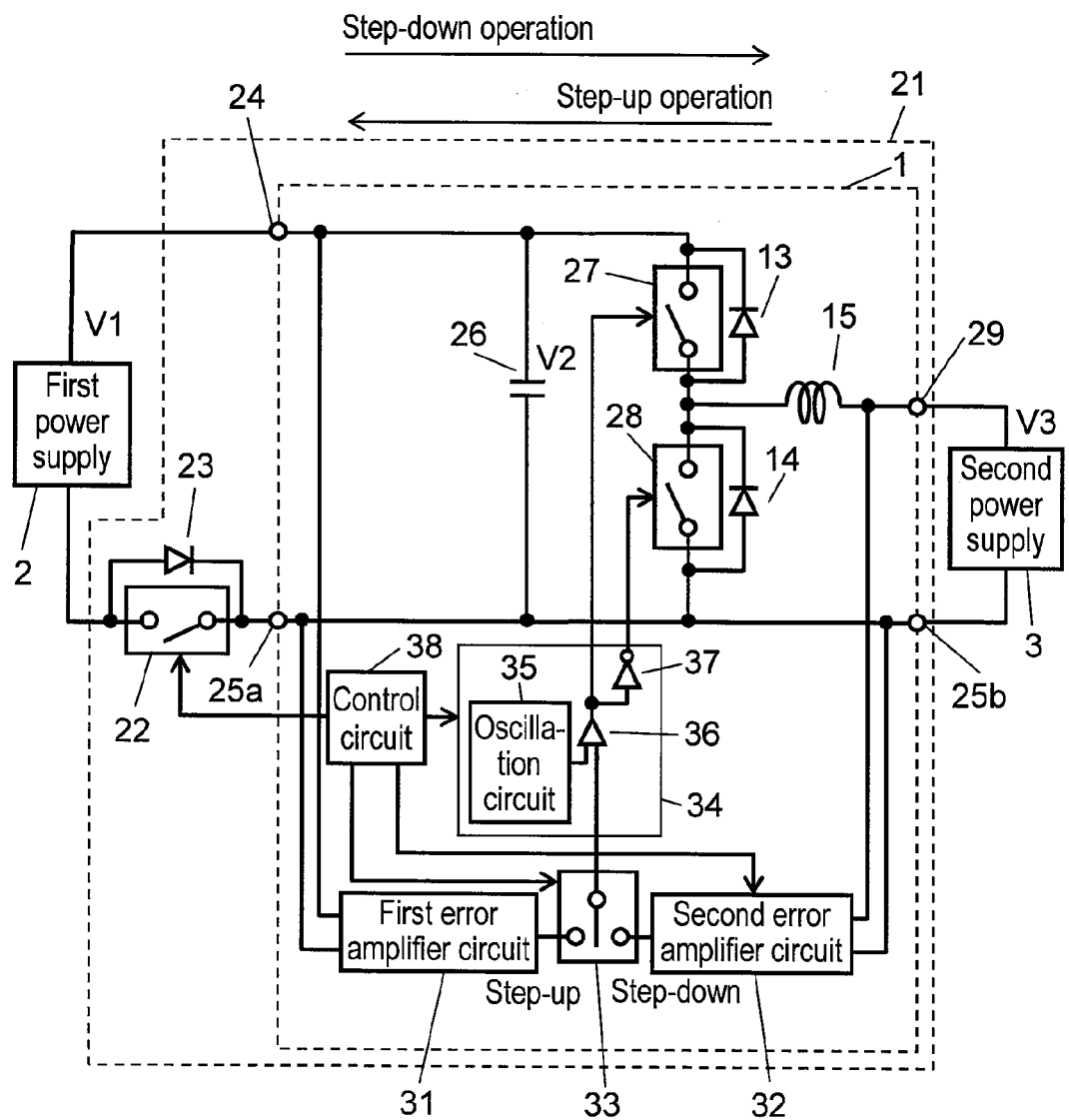
FIG. 4 is a block circuit diagram of another configuration of the bidirectional power supply device according to the first embodiment of the present invention.
Figure 5:
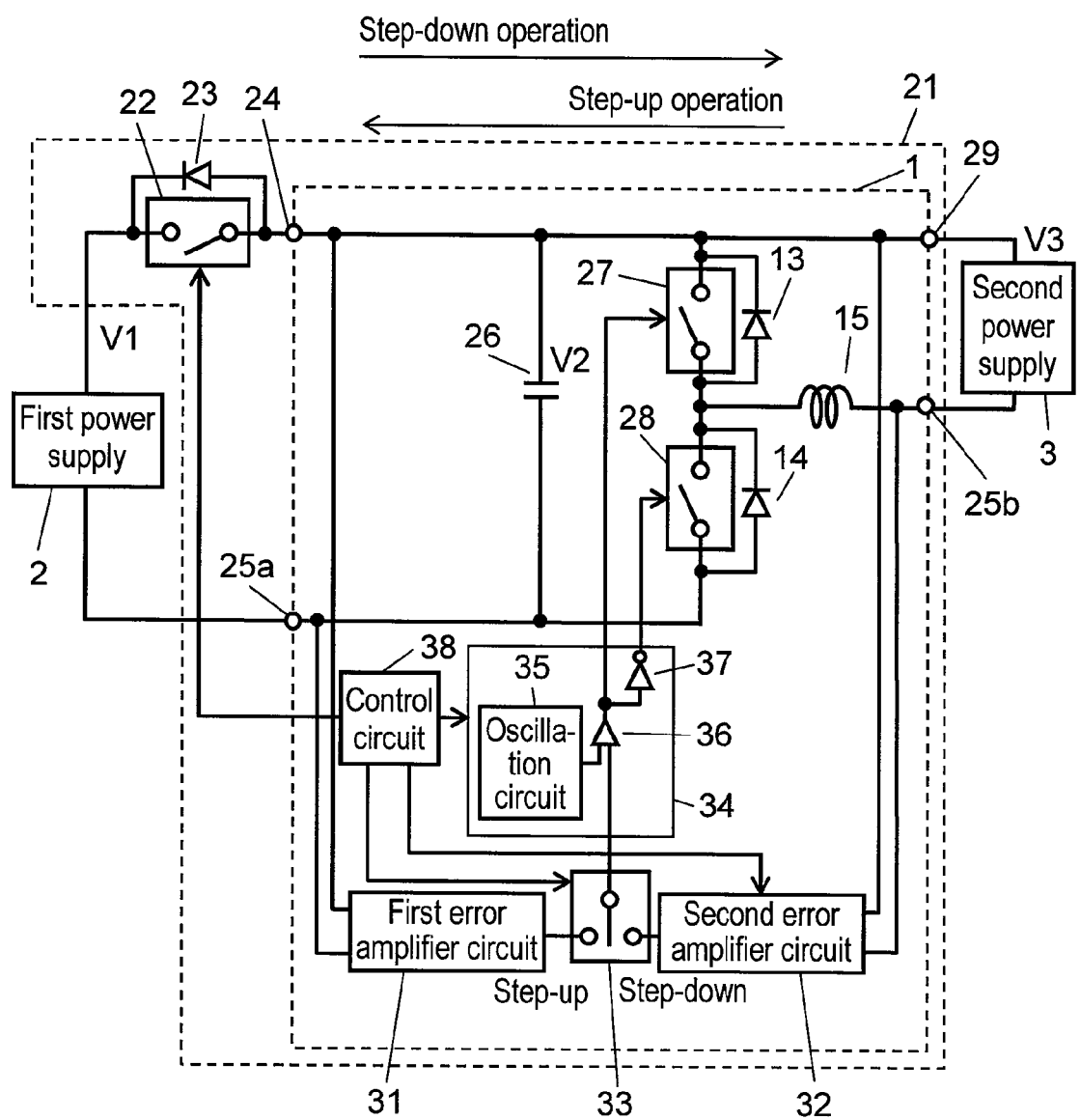
FIG. 5 is a block circuit diagram of another further configuration of the bidirectional power supply device according to the first embodiment of the present invention.

FIG. 1 is a block circuit diagram of a bidirectional power supply device according to a first embodiment of the present invention, and FIG. 2 is a block circuit diagram of the bidirectional power supply device and peripheral circuits of the first embodiment. FIG. 3A is a timing chart showing change over time of voltage V2 of capacitor 26 of the first embodiment, and FIG. 3B is a timing chart showing change over time of voltage V3 of capacitor 3a of the first embodiment. FIG. 3C is a timing chart showing change over time of ON time ratio of a first switch of the first embodiment, FIG. 3D is a timing chart showing an ON/OFF timing of a third switch of the first embodiment, and FIG. 3E is a timing chart showing a switching timing of a changeover switch of the first embodiment. FIG. 4 is a block circuit diagram of another configuration of the bidirectional power supply device according to the first embodiment, and FIG. 5 is a block circuit diagram of another further configuration of the bidirectional power supply device according to the first embodiment.

In the first embodiment, a description will be given on a case where the power obtained by braking the automobile is step-down in the bidirectional power supply device and charged in a capacitor that can be rapidly charged/discharged, and the voltage of the capacitor is stepped up and regenerated to a battery.

In FIG. 1, bidirectional power supply device 21 is connected between first power supply 2 and second power supply 3. As shown in FIG. 2, first power supply 2 includes power generator 4 coupled to the engine (not shown), battery 2a, load 2b which consumes power of power generator 4 and battery 2a, and smoothing capacitor 2c. Second power supply 3 includes capacitor 3a.

Returning to FIG. 1, details of bidirectional power supply device 21 will be described. Bidirectional power supply device 21 includes bidirectional DC-DC converter 1 and third switch 22. Third switch 22 can be ON/OFF controlled from the outside, and FET is used in the present embodiment.

Parallel diode 23 is a body diode of FET. Third switch 22 and parallel diode 23 have one end connected to first positive terminal 24 of DC-DC converter 1, and the other end connected to a positive electrode of first power supply 2. Parallel diode 23 has an anode side connected to first positive terminal 24.

In DC-DC converter 1, capacitor 26 is connected between first positive terminal 24 and first negative terminal 25a. The capacity of capacitor 26 is smaller than the capacity of capacitor 3a of second power supply 3.

First switch 27 and second switch 28 are connected in series to both ends of capacitor 26. First switch 27 and second switch 28 can be externally controlled to be alternately and repeatedly turned ON/OFF and FET is used similar to third switch 22 in the present embodiment. Therefore, first switch 27 and second switch 28 respectively includes body diode 13 and 14 formed as illustrated in the figure. DC-DC converter 1 is connected so that the longer an ON time of first switch 27 becomes, the higher the voltage of second positive terminal 29 becomes.

One end of coil 15, which is an inductance element, is connected to a node of first switch 27 and second switch 28. The other end of coil 15 is connected to second positive terminal 29. Although not shown in FIG. 1, a smoothing capacitor may be arranged between second positive terminal 29 and second negative terminal 25b.

As described above, battery 2a of first power supply 2 is connected between third switch 22 and first negative terminal 25a, and capacitor 3a of the second power supply is connected between second positive terminal 29 and second negative terminal 25b.

First error amplifier circuit 31 is connected to first positive terminal 24. First error amplifier circuit 31 outputs an error with respect to a stored set voltage to have the voltage of first positive terminal 24 in the step-up operation constant. Second error amplifier circuit 32 is connected to second positive terminal 29. Second error amplifier circuit 32 outputs an error with respect to a stored set voltage to have the voltage of second positive terminal 29 in the step-down operation constant.

The output of first error amplifier circuit 31 and the output of second error amplifier circuit 32 are connected to changeover switch 33. The step-up operation from second power supply 3 to first power supply 2 is performed when changeover switch 33 selects first error amplifier circuit 31. The step-down operation from first power supply 2 to second power supply 3 is performed when changeover switch 33 selects second error amplifier circuit 32.

The signal from changeover switch 33 is input to switching signal generation circuit 34. Switching signal generation circuit 34 compares the input signal and an output of oscillation circuit 35 in comparator 36, generates ON/OFF signal, and inputs the ON/OFF signal to first switch 27 and inputs the inverted ON/OFF signal to second switch 28. DC-DC converter 1 thereby performs the step-up operation or the step-down operation. Control circuit 38 performs the switching control of changeover switch 33, the operation control of switching signal generation circuit 34, the ON/OFF control of third switch 22, and the control of the set voltage of second error amplifier circuit 32.

The operation of bidirectional power supply device 21 will be described. When the braking energy of the automobile is supplied to bidirectional power supply device 21 as power by power generator 4, one part can be charged in battery 2a but not all the power of the braking energy that rapidly increases can be charged. Control circuit 38 turns ON third switch 22, and switches changeover switch 33 to the step-down side.

Switching signal generation circuit 34 outputs the ON/OFF signals inverted from each other to first switch 27 and second switch 28 to perform the step-down operation based on the output of second error amplifier circuit 32. As a result, the power from battery 2a of first power supply 2 is stepped down, and charged in capacitor 3a of second power supply 3.

The timing chart of the step-down operation is shown on the left half of FIG. 3A to FIG. 3E. Since changeover switch 33 is selecting the step-down operation at time t0 (see FIG. 3E), bidirectional power supply device 21 performs the step-down operation. Here, third switch 22 is turned ON (see FIG. 3D), and thus voltage V2 of capacitor 26 is equal to voltage V1 of battery 2a (see FIG. 3A). Voltage V1 is charged in capacitor 3a by the step-down operation. Therefore, V3 rises from a state where voltage V3 (see FIG. 3B) of capacitor 3a is low at time t0 as switching signal generation circuit 34 operates (see FIG. 3C) so that ON time ratio D (D=ON time of first switch 27/one cycle time of ON/OFF) of first switch 27 increases with elapse of time. This is because DC-DC converter 1 is connected such that the longer an ON time of first switch 27 becomes, the higher the voltage of second positive terminal 29 becomes. Voltage V1 of battery 2a is meanwhile constant, and thus voltage V2 of capacitor 26 directly connected to battery 2a is also constant.

Voltage V3 of capacitor 3a rises and approaches the charging voltage set at time t1. At this point, that is, at the point the supply of power from first positive terminal 24 to second positive terminal 29 is stopped, control circuit 38 turns OFF third switch 22 (see FIG. 3D). The power is subsequently sent from capacitor 26 to capacitor 3a, and thus voltage V2 of capacitor 26 drops. Bidirectional power supply device 21 rapidly raises ON time ratio D of first switch 27 to maximum Dmax ($\leq 1$) in order to raise voltage V3 to the set voltage. Thus, control circuit 38 controls second error amplifier circuit 32 to forcibly raise the set voltage of second positive terminal 29. The power supply from capacitor 26 to capacitor 3a temporarily increases as a result, and the time until ON time ratio D becomes Dmax can be shortened. "D" can be rapidly raised to set Dmax in such manner. According to such measures, high-speed operation without heat generation of body diode 14 becomes possible as hereinafter described. Second error amplifier circuit 32 is controlled by control circuit 38 so that the set voltage of second positive terminal 29 returns to an original set value when performing the step-down operation again.

Voltage V2 of capacitor 26 lowers to V3/Dmax at time t2. In the present embodiment, "D" is maintained at Dmax until t3 to further ensure the operation (see FIG. 3C). Voltage V2 tends to lower by setting "D" at Dmax, and thus V1>V2 is constantly realized, and parallel diode 23 is reliably turned OFF.

As described above, the power is supplied from capacitor 26 to capacitor 3a after time t1. In this case, change of V3 is small if the capacity of capacitor 3a is greater than that of capacitor 26. Capacitor 3a is thus set to a larger capacity than capacitor 26. The heat generation of body diode 14 thus does not occur and voltage V3 can be stabilized as hereinafter described.

At time t3, control circuit 38 stops the operation of switching signal generation circuit 34, and turns OFF first switch 27 and second switch 28. The charging of capacitor 3a is then terminated in the voltage state of V2=V3/Dmax, as shown in FIG. 3A, and bidirectional power supply device 21 is stopped.

The step-up operation of supplying power from capacitor 3a to battery 2a will now be described. Control circuit 38 switches changeover switch 33 from step-down to step-up during a stop period after time t3 (see FIG. 3E).

The step-up operation starts at time t4. Third switch 22 remains in the OFF state (see FIG. 3D). ON time ratio D of first switch 27 is set to maximum value Dmax at time t4 (see FIG. 3C). First switch 27 and second switch 28 start the operation of alternately turning ON/OFF. Second switch 28 (MOS transistor 112) does not need to be turned OFF at the start-up though the conventional device needs.

Since V2=V3/Dmax at time t4, the current flowing through coil 15 will not rapidly increase. Therefore, overcurrent will not flow at the instant that first switch 27 is turned ON. Thereafter, V2 is raised and controlled to be the set voltage by first error amplifier circuit 31. In other words, switching signal generation circuit 34 lowers ON time ratio D of first switch 27 corresponding to V2 from change in output of first error amplifier circuit 31. According to such control, voltage V3 of capacitor 3a lowers with time, and voltage V2 of capacitor 26 rises with time and is set at the set voltage, as shown in FIG. 3A and FIG. 3B.

Second switch 28 is turned ON when first switch 27 is turned OFF, so that current does not flow to body diode 14. Thus, body diode 14 does not generate heat.

At time t5, voltage V2 of capacitor 26 becomes equal to voltage V1 of battery 2a. Control circuit 38 continuously charges the charges of capacitor 3a in battery 2a while performing a control to gradually lower ON time ratio D of first switch 27. The operation after t5 is a steady-state step-up operation of bidirectional power supply device 21.

The power once charged in capacitor 3a is thus regenerated to battery 2a. Parallel diode 23 of third switch 22 can charge the stepped up charges of capacitor 26 to battery 2a even when third switch 22 is turned OFF, but no trouble will arise even if third switch 22 is turned ON when the current flows to parallel diode 23.

Therefore, the present invention realizes a bidirectional power supply device in which overcurrent in start-up is prevented and the body diode does not generate heat.

In the present embodiment, a configuration of once charging the braking energy in capacitor 3a and regenerating it to battery 2a has been described in the present embodiment, but this can be applied even to a backup application of supplying power from capacitor 3a to load 2b when the voltage of battery 2a lowers for some reason. In this case, the diode is connected to an elliptical dotted line portion of FIG. 2 such that the anode side is on battery 2a side. Thus, the current will not flow in from capacitor 3a to battery 2a when the voltage of battery 2a lowers, and the power can be supplied to load 2b over a long period of time by that much.

First power supply 2 may have a configuration not equipped with power generator 4. This can be applied to applications of rapidly supplying power to load 2b after charging the power of battery 2a to capacitor 3a.

Furthermore, third switch 22 is connected to first positive terminal 24 in the present embodiment, but similar operation is performed and similar effects can be obtained even when it is connected to first negative terminal 25a as shown in FIG. 4.

Moreover, the configuration in which first negative terminal 25a and second negative terminal 25b of DC-DC converter 1 are connected has been described in the present embodiment, but similar effects can be obtained with a configuration in which first positive terminal 24 and second positive terminal 29 are connected as shown in FIG. 5.

Second Embodiment

Figure 6:
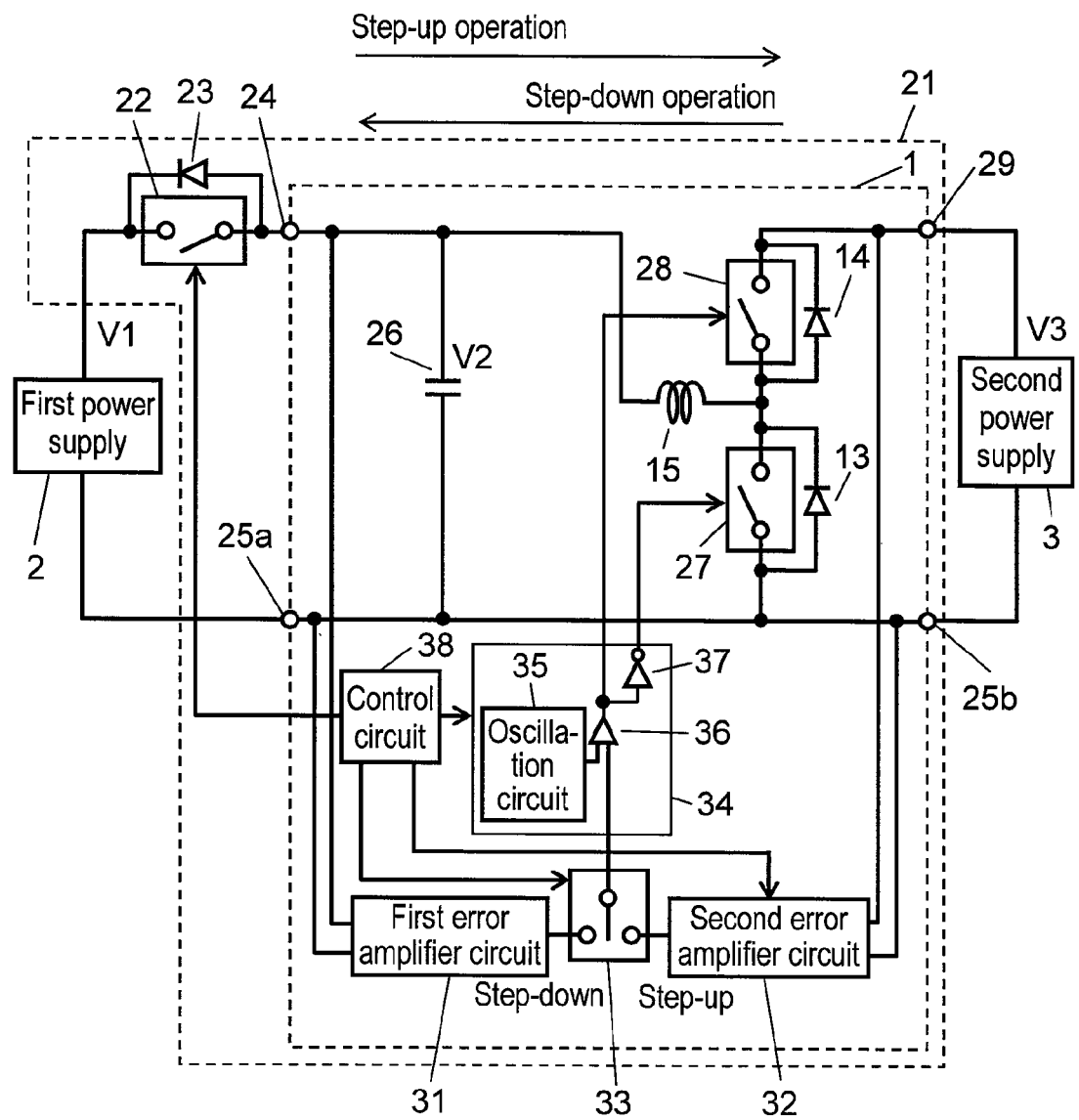
FIG. 6 is a block circuit diagram of a bidirectional power supply device according to a second embodiment of the present invention.
Figure 7A:
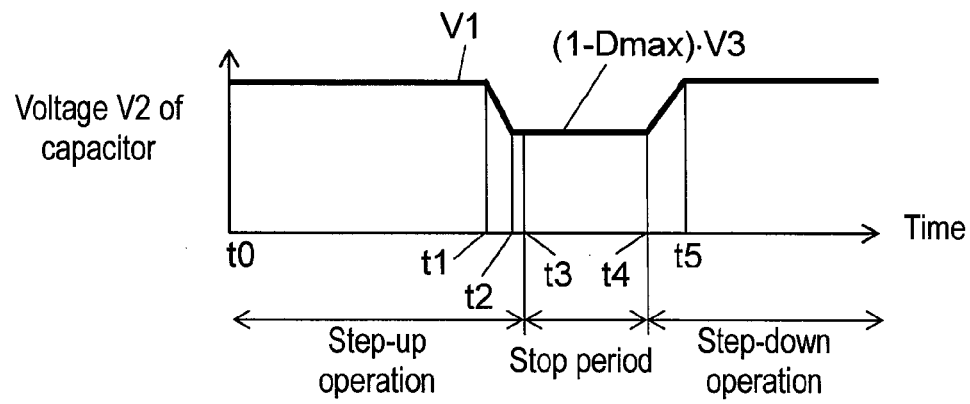
FIG. 7A is a timing chart showing change over time of voltage V2 of a capacitor of the second embodiment of the present invention.
Figure 7B:
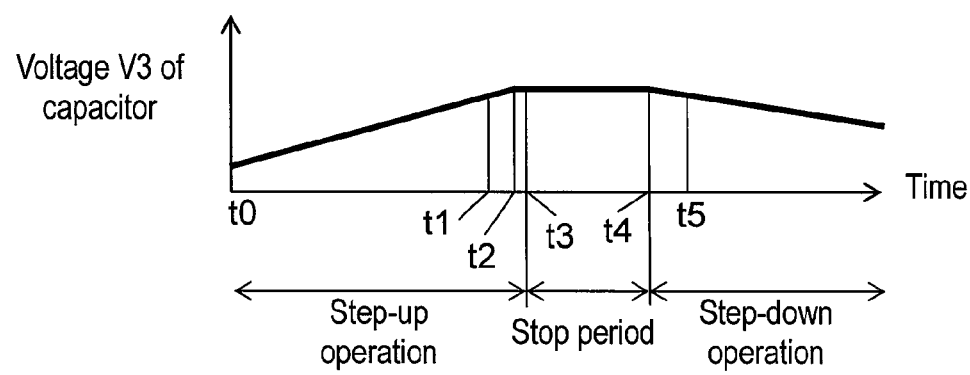
FIG. 7B is a timing chart showing change over time of voltage V3 of a capacitor of the second embodiment of the present invention.
Figure 7C:
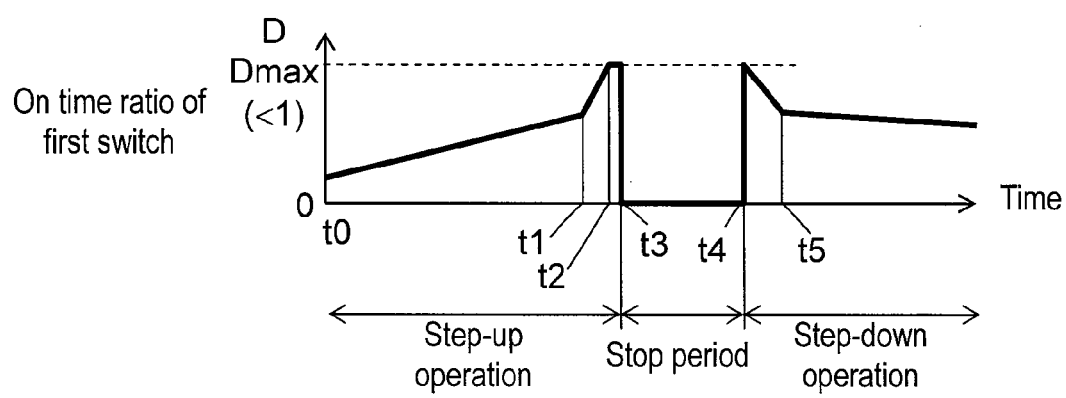
FIG. 7C is a timing chart showing change over time of ON time ratio of a first switch of the second embodiment of the present invention.
Figure 7D:
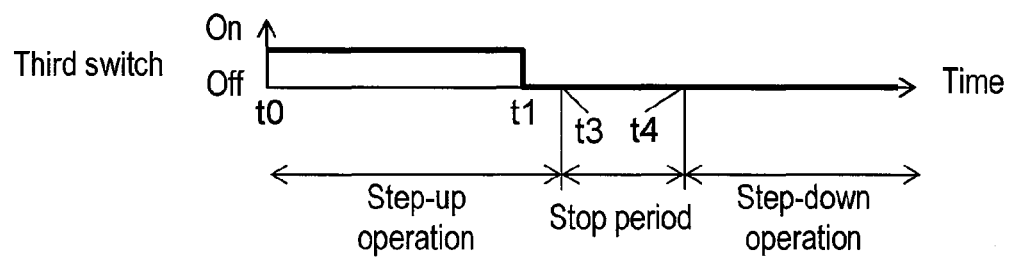
FIG. 7D is a timing chart showing an ON/OFF timing of a third switch of the second embodiment of the present invention.
Figure 7E:
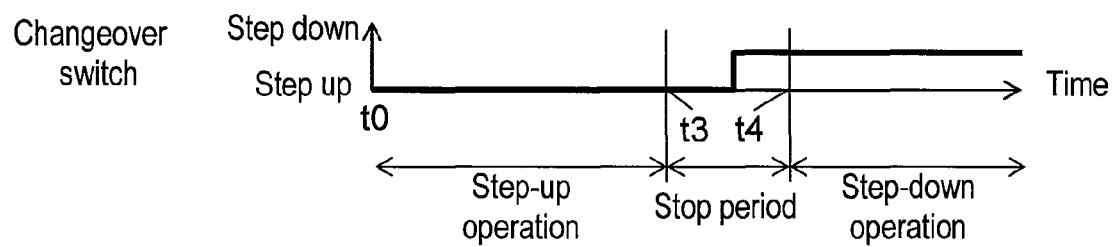
FIG. 7E is a timing chart showing a switching timing of a changeover switch of the second embodiment of the present invention.
Figure 8:
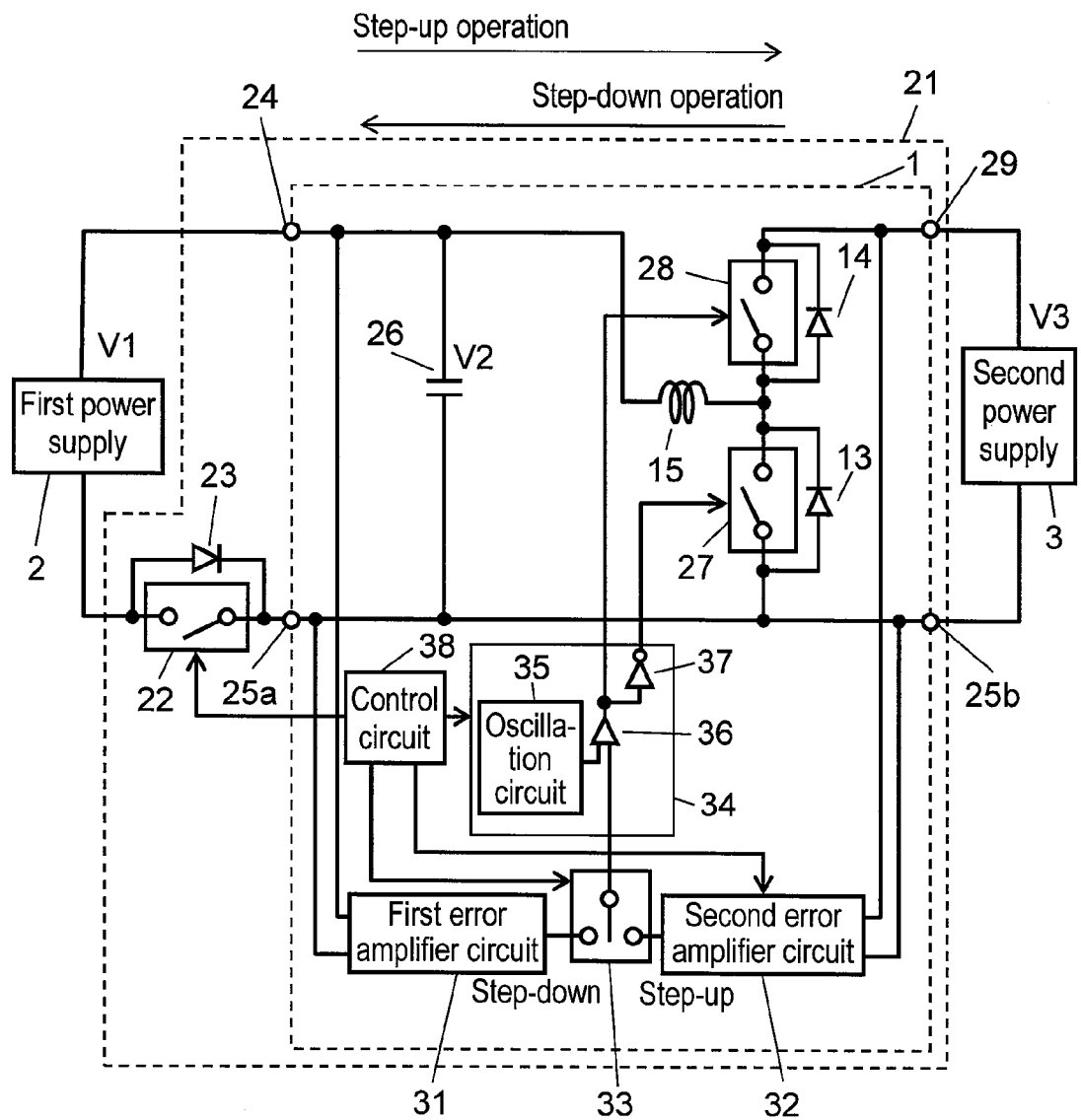
FIG. 8 is a block circuit diagram of another configuration of the bidirectional power supply device according to the second embodiment of the present invention.
Figure 9:
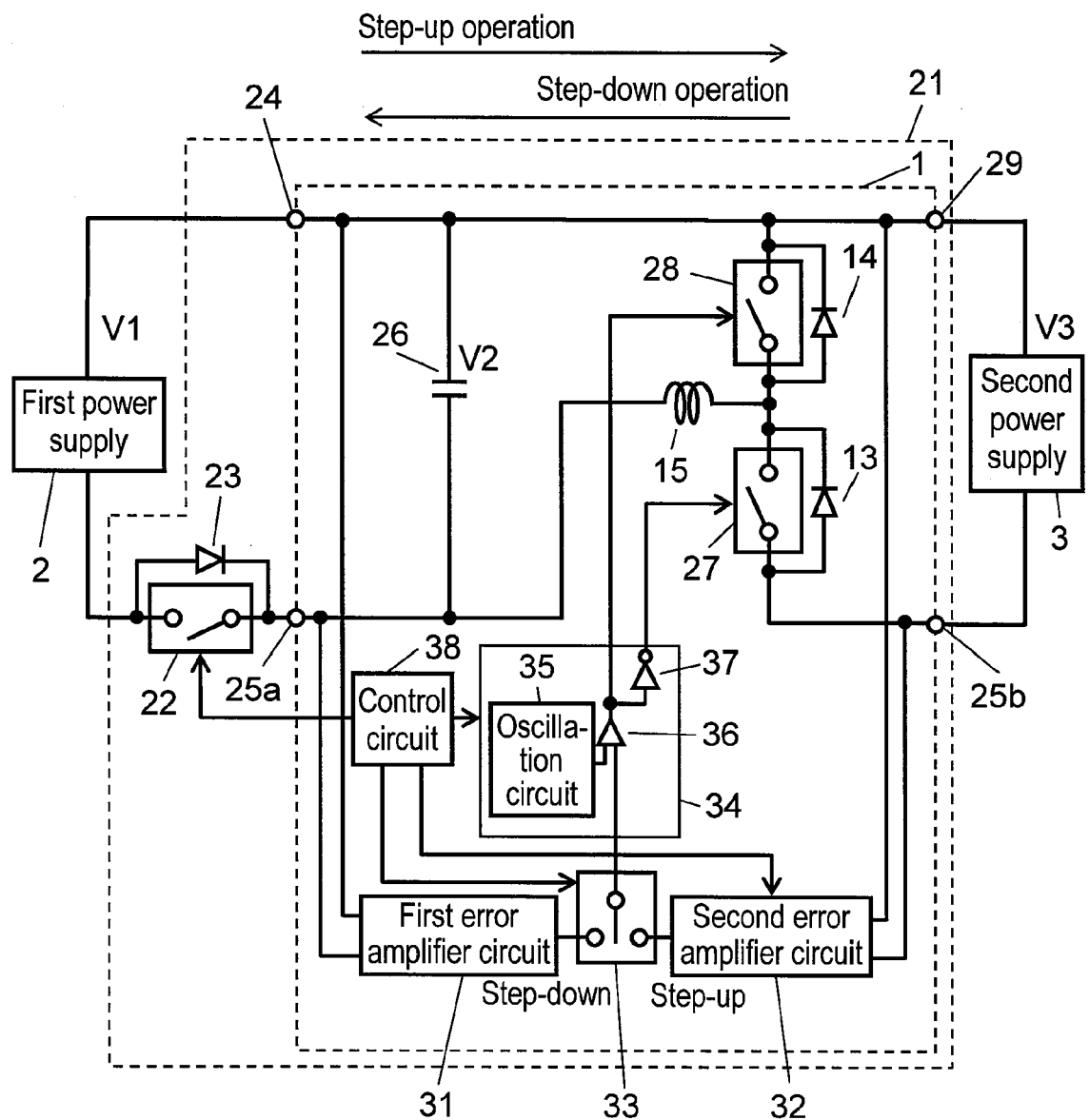
FIG. 9 is a block circuit diagram of another further configuration of the bidirectional power supply device according to the second embodiment of the present invention.

FIG. 6 is a block circuit diagram of a bidirectional power supply device according to a second embodiment of the present invention. FIG. 7A is a timing chart showing change over time of voltage V2 of a capacitor of the second embodiment. FIG. 7B is a timing chart showing change over time of voltage V3 of a capacitor of the second embodiment. FIG. 7C is a timing chart showing change over time of ON time ratio of a first switch of the second embodiment. FIG. 7D is a timing chart showing an ON/OFF timing of a third switch of the second embodiment. FIG. 7E is a timing chart showing a switching timing of a changeover switch of the second embodiment. FIG. 8 is a block circuit diagram of another configuration of the bidirectional power supply device according to the second embodiment, and FIG. 9 is a block circuit diagram of another further configuration of the bidirectional power supply device according to the second embodiment. The components of FIG. 6 are the same as FIG. 1, and thus the same reference numerals are used and the description will be omitted. In FIG. 7, the description on the operations same as in FIG. 3 will be omitted. The bidirectional power supply device of the present embodiment is a step-up type in which the voltage of the second power supply is higher than the voltage of the first power supply.

The difference in configuration between FIG. 6 and FIG. 1 is as follows.

1) One end of coil 15 is connected to the positive pole side of capacitor 26, and the other end of coil 15 is connected to a node of second switch 28 and first switch 27.

2) The arrangement of first switch 27 and second switch 28 is reversed.

3) The directions of step-up and step-down of changeover switch 33 are reversed.

The step-up operation becomes substantially the same as the step-down operation described in the first embodiment according to such configuration, but differs in the following points.

1) The step-up and the step-down of FIG. 7E are the opposite of FIG. 3E.

2) Since the arrangement of first switch 27 and second switch 28 is reversed, voltage V2 of capacitor 26 when ON time ratio D of the first switch is a maximum (Dmax) is V2=(1−Dmax)·V3 (see FIG. 7A).

3) Since the bidirectional power supply device is of step-up type, Dmax<1.

According to such operation, voltage V2 of capacitor 26 in the stop period lowers even in the step-up type. Therefore, the voltage state similar to the first embodiment is obtained when stopped and when started, and thus effects similar to the first embodiment, that is, the step-up bidirectional power supply device simultaneously achieving the prevention of overcurrent in start-up and prevention of heat generation of the body diode can be realized.

In a bidirectional power supply device simultaneously equipped with the step-up type and the step-down type circuit configuration as well, the prevention of overcurrent in start-up and the prevention of heat generation of the body diode can be simultaneously achieved by appropriately combining the configurations of the first and the second embodiments, and performing similar operation.

Furthermore, third switch 22 is connected to first positive terminal 24 in the first embodiment, but similar operation is performed and similar effects can be obtained even when it is connected to first negative terminal 25a as shown in FIG. 8.

The configuration in which first negative terminal 25a and second negative terminal 25b of DC-DC converter 1 are connected has been described in the present embodiment, but similar effects can be obtained with a configuration in which first positive terminal 24 and second positive terminal 29 are connected as shown in FIG. 9.

Third Embodiment

Figure 10:
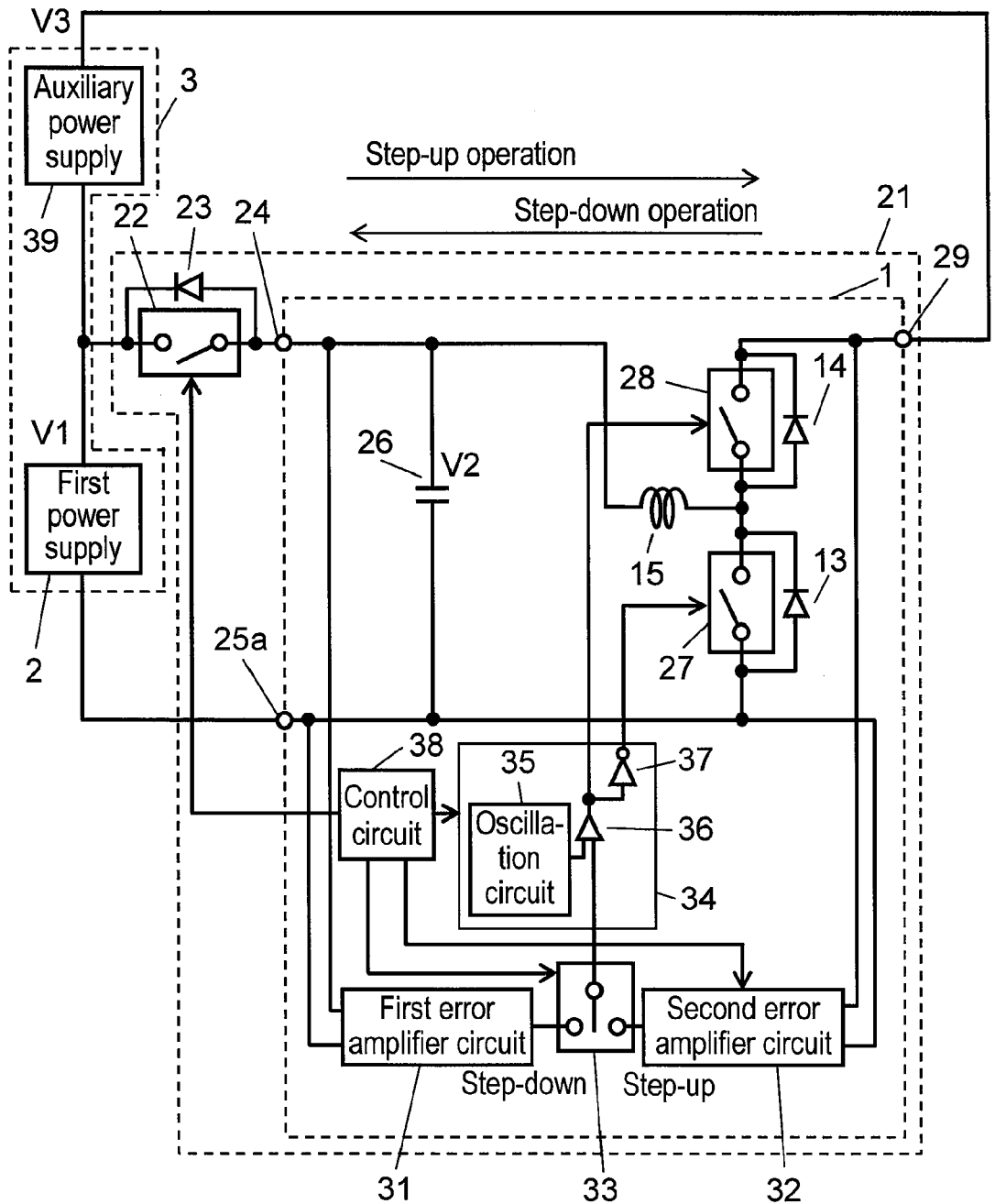
FIG. 10 is a block circuit diagram of a bidirectional power supply device according to a third embodiment of the present invention.
Figure 11:
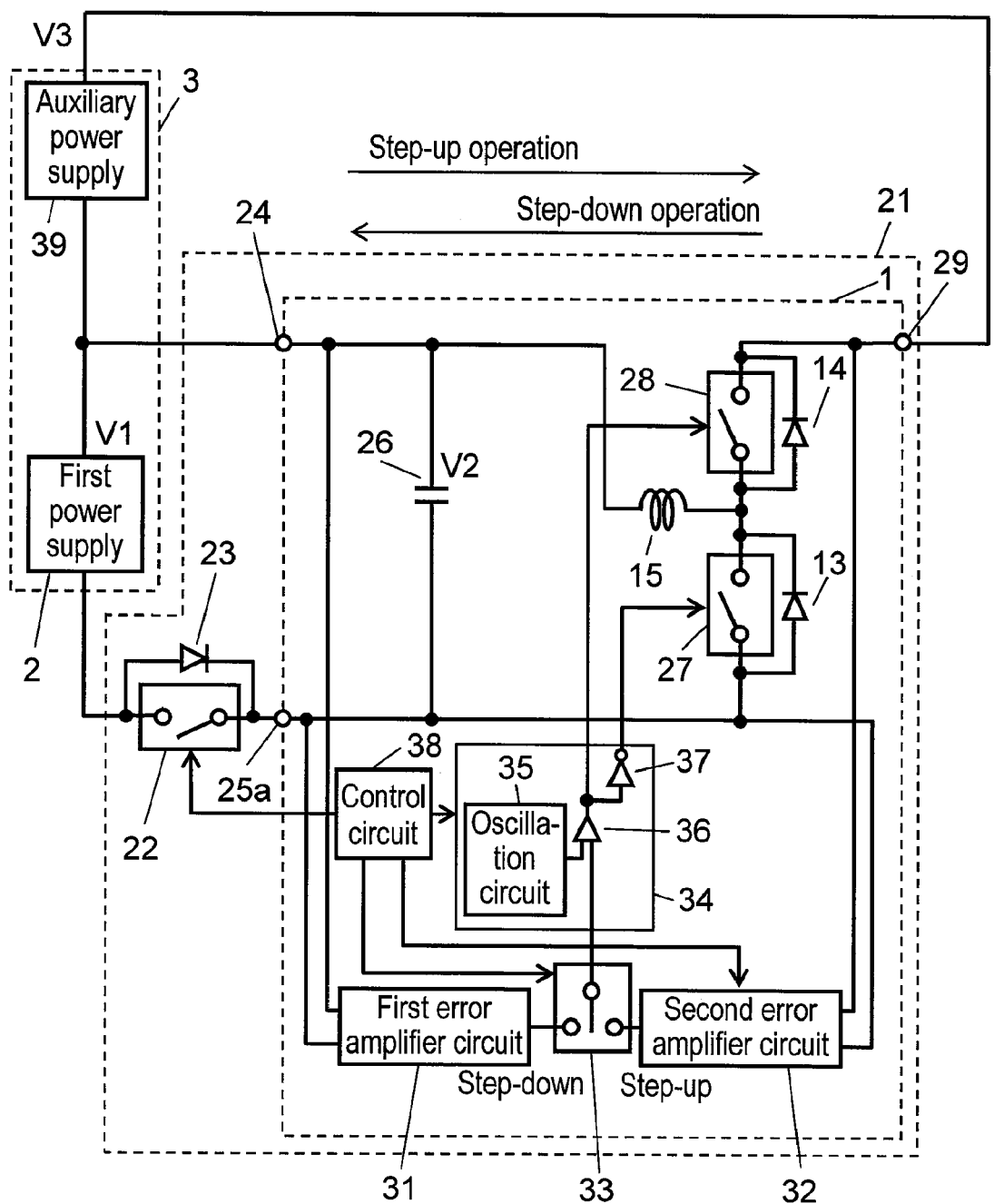
FIG. 11 is a block circuit diagram of another configuration of the bidirectional power supply device according to the third embodiment of the present invention.
Figure 12:
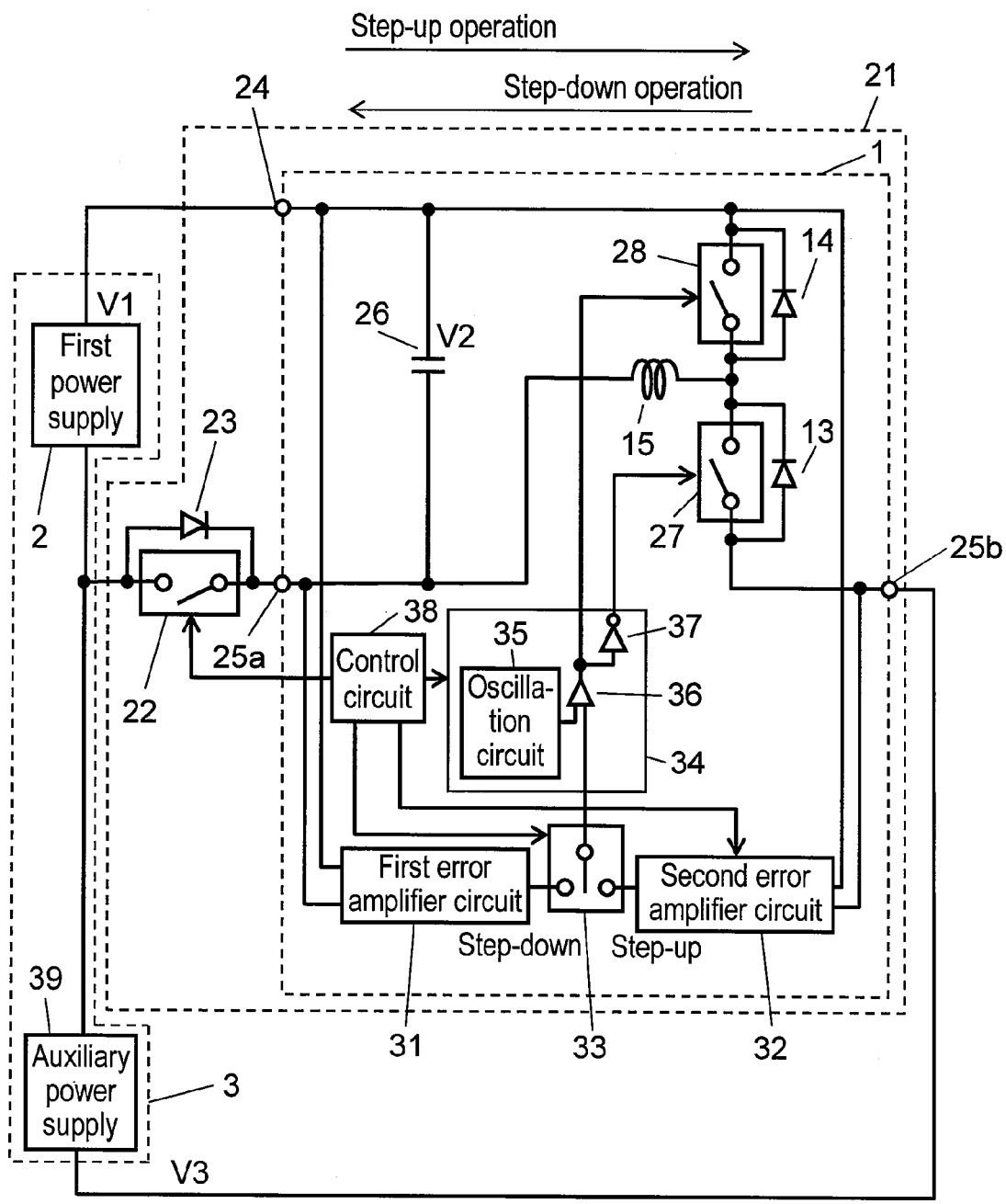
FIG. 12 is a block circuit diagram of another further configuration of the bidirectional power supply device according to the third embodiment of the present invention.
Figure 13:
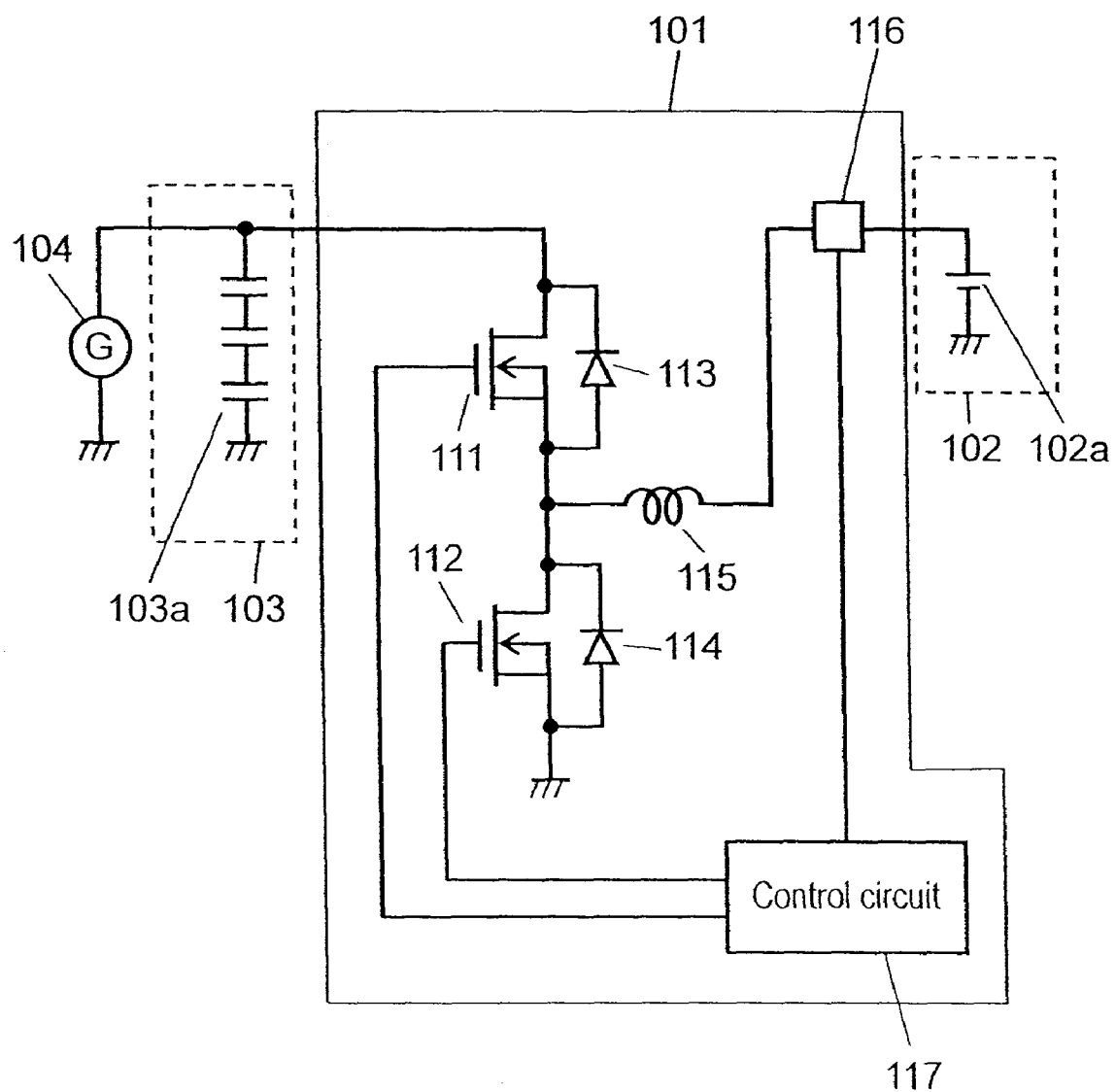
FIG. 13 is a block circuit diagram of a conventional bidirectional power supply device.
Figure 14A:
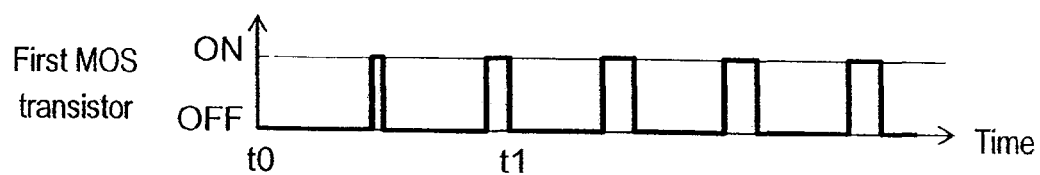
FIG. 14A is a timing chart of ON/OFF operation of a first MOS transistor of the conventional bidirectional power supply device.
Figure 14B:
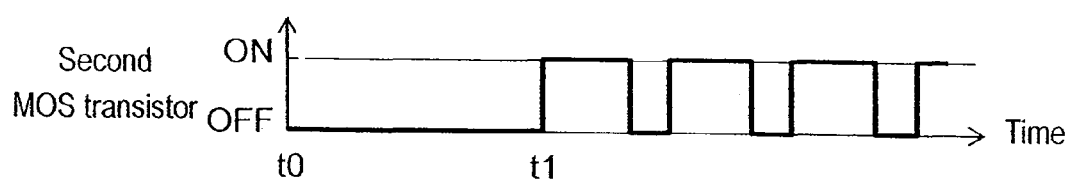
FIG. 14B is a timing chart of ON/OFF operation of a second MOS transistor of the conventional bidirectional power supply device.
Figure 14C:
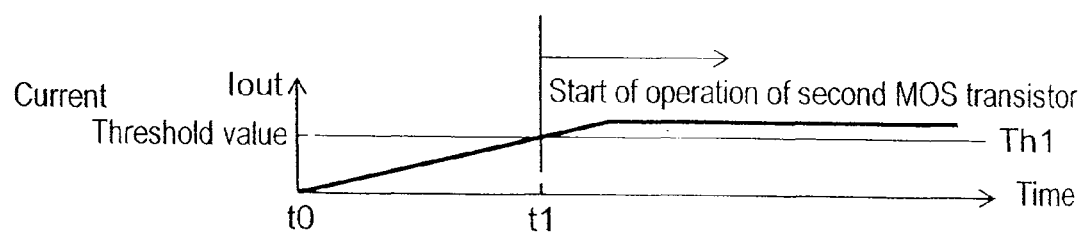
FIG. 14C is a timing chart showing change over time of the current to the battery of the conventional bidirectional power supply device.

FIG. 10 is a block circuit diagram of a bidirectional power supply device according to a third embodiment of the present invention, and FIG. 11 is a block circuit diagram of another configuration of the bidirectional power supply device according to the third embodiment. FIG. 12 is a block circuit diagram of another further configuration of the bidirectional power supply device according to the third embodiment. In FIG. 10, same reference numerals are denoted for the components same as in FIG. 6 in FIG. 10, and the description will be omitted.

Bidirectional power supply device 21 of the present embodiment has the same configuration as bidirectional power supply device 21 of the second embodiment other than that it includes second power supply 3 of a configuration in which first power supply 2 and auxiliary power supply 39 are connected in series, and the negative electrode of first power supply 2 and the negative electrode of second power supply 3 are common. Auxiliary power supply 39 is configured by capacitor 3a, and is connected in series to battery 2a configuring first power supply 2. In the present embodiment as well, bidirectional power supply device 21 performs the operation of stepping up the voltage of first power supply 2, and supplying the power to second power supply 3. It also performs the operation of stepping down the voltage of second power supply 3 and supplying the power to first power supply 2. The detailed operation is the same as bidirectional power supply device 21 of the second embodiment, and thus similar effects can be obtained even when second power supply 3 has a configuration in which first power supply 2 and auxiliary power supply 39 are connected in series.

In the circuit configuration of FIG. 10, a diode is connected to the elliptical portion of FIG. 2, similar to the first embodiment, and can be used for backup application when the voltage of battery 2a lowers. In the present embodiment, second power supply 3 is configured with a series circuit of first power supply 2 and auxiliary power supply 39, and thus the voltage of battery 2a included in first power supply 2 can be used even when the voltage of second power supply 3 is lowered. Therefore, the capacity necessary for capacitor 3a configuring auxiliary power supply 39 can be reduced.

As shown in FIG. 11, similar operation is performed and similar effects can be obtained even when third switch 22 is connected to first negative terminal 25a.

The configuration in which the negative electrodes of first power supply 2 and second power supply 3 are commonly connected has been described in the present embodiment, but similar effects can be obtained with a configuration in which positive electrodes of first power supply 2 and second power supply 3 are commonly connected, as shown in FIG. 12.

INDUSTRIAL APPLICABILITY

The bidirectional power supply device of the present invention achieves both the prevention of overcurrent in time of start-up and the prevention of heat generation of the body diode, and thus is useful as a power supply device capable of supplying and receiving power bidirectionally.

The invention claimed is:
1. A bidirectional power supply device comprising:
a bidirectional DC-DC converter including:
    a first positive terminal, a first negative terminal, a second positive terminal, and a second negative terminal for supplying and receiving power;
    a capacitor connected in parallel between the first positive terminal and the first negative terminal;
    a first switch and a second switch connected in series and alternately and repeatedly turned ON/OFF;
    an inductance element having one end connected to a node of the first switch and the second switch;
    a switching signal generation circuit for generating an ON/OFF signal of the first switch and the second switch; and
    a control circuit for controlling the switching signal generation circuit,
    wherein the bidirectional DC-DC converter is connected such that the longer an ON time of the first switch becomes, the higher a voltage of the second positive terminal and the second negative terminal becomes;
a third switch having one end connected to the first positive terminal or the first negative terminal, and being ON/OFF controlled by the control circuit;
a first power supply connected in series to the third switch, the series circuit being connected between the first positive terminal and the first negative terminal; and
a second power supply connected between the second positive terminal and the second negative terminal; wherein
the control circuit turns OFF the third switch and operates the switching signal generation circuit so that the ON time of the first switch becomes a maximum when stopping supply of power from the first positive terminal and the first negative terminal to the second positive terminal and the second negative terminal; and
the control circuit makes the switching signal generation circuit started so that the ON time of the first switch becomes a maximum with the third switch turned OFF when supplying power from the second positive terminal and the second negative terminal to the first positive terminal and the first negative terminal.
2. The bidirectional power supply device according to claim 1, wherein the control circuit raises a set voltage of the second positive terminal until turning OFF the third switch and stopping the supply of power from the first positive terminal and the first negative terminal to the second positive terminal and the second negative terminal.
3. The bidirectional power supply device according to claim 1, wherein the second power supply has a larger capacity than the capacitor.
4. The bidirectional power supply device according to claim 1, wherein the second power supply has a configuration in which the first power supply and an auxiliary power supply are connected in series, and positive electrodes or negative electrodes of the first power supply and the second power supply are common.

* * * * *